Sept. 6, 1960  W. REPPE ET AL  2,951,881
PRODUCTION OF CYCLO-OCTATETRAENE
Filed Dec. 30, 1957
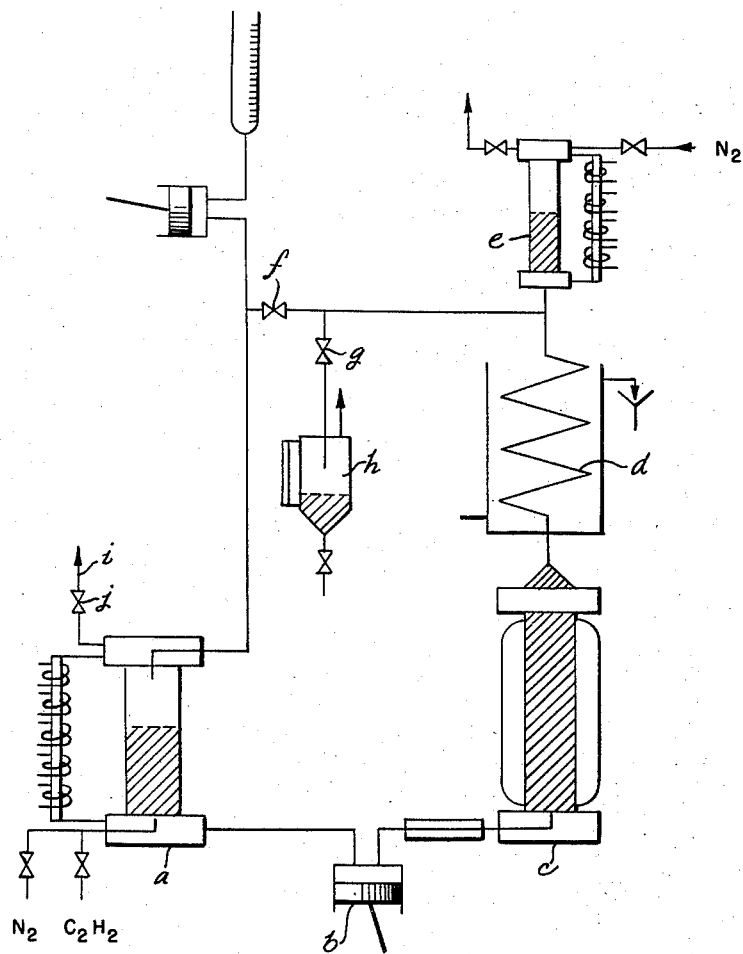
INVENTORS:
WALTER REPPE
WOLFGANG PFAB
NIKOLAUS VON KUTEPOW
WALTER BUECHE
BY
ATT'YS

2,951,881
PRODUCTION OF CYCLO-OCTATETRAENE

Walter Reppe, Heidelberg, Wolfgang Pfab, Ludwigshafen (Rhine), Nikolaus von Kutepow, Karlsruhe-Rueppurr, and Walter Bueche, Ludwigshafen (Rhine), Germany, assignors to Badische Anilin- & Soda-Fabrik Aktiengesellschaft, Ludwigshafen (Rhine), Germany Filed Dec. 30, 1957, Ser. No. 706,117

Claims priority, application Germany Dec. 31, 1956

7 Claims. (Cl. 260—666)

This invention relates to a process for the production of cyclo-octatetraene by cyclizing polymerization of acetylene in the liquid phase. In particular the invention relates to a process operated in two stages, the saturation of the solvent with acetylene being carried out in the first stage while the cyclization of the acetylene while avoiding the gas phase with its risk of explosions is carried out in the second stage of the process.

The object of the invention is to discover a process which will render posible the safe conversion of acetylene at high space-time yields which can only be achieved at appropriately high concentrations of acetylene in the reaction medium.

It is already known that cyclo-octatetraene can be prepared by cyclizing polymerization of acetylene in liquid phase while using nickel salts, for example nickel cyanide, thiocyanate or enolates as catalyst. For this purpose there preferably serve as solvents those liquids which have a good solvent power for acetylene, for example tetrahydrofurane.

Since the speed of formation of the cyclo-octatetraene increases markedly with increasing temperature and with increasing concentration of the dissolved acetylene, the synthesis is carried out at elevated temperature, preferably between 80° and 120° C., and under increased pressure of acetylene.

A great difficulty in carrying out the synthesis technically has hitherto been that the acetylene cannot be safely handled directly under increased pressure.

By a safe handling of acetylene there is always understood a course of the reaction which is technically unobjectionable, i.e. which is free from trouble, which saves expenditure for security measures, for example placing the whole apparatus under ten times the nominal pressure, but which in no case permits disregarding the usual precautions when working with acetylene.

All processes hitherto known for the production of cyclo-octatetraene operate by causing the reaction solution which has been heated to the reaction temperature to remain in contact with gaseous acetylene and to effect subsequent saturation in accordance with the consumption of acetylene. In order to avoid the risk of an explosion or detonation the acetylene is diluated by the addition of large amounts of an inert gas, for example nitrogen, so that it is necessary to use high total pressures in order to achieve the necessary acetylene partial pressure. Thus for example acetylene-nitrogen mixtures with 22% of acetylene are used under a total pressure of 100 excess atmospheres. This method has the disadvantage that an extensive additional apparatus, especially decompression and compression plant or absorption plant, is necessary for the replenishment of the acetylene consumed in the gas phase, because undiluated acetylene cannot safely be compressed above 28 excess atmospheres and a direct subsequent compression is therefore impossible. A further disadvantage is to be seen in the fact that working with extraordinarily high pressures requires apparatus with a correspondingly high load capacity.

We have now found that the synthesis of cyclo-octatetraene from acetylene can be carried out safely while using considerably lower pressures and without the use of additional gas decompression and compression plant or absorbers, in a continuous manner and with high space-time yields, by saturating the reaction solution at low to moderately elevated temperature, preferably between +5° and +30° C., under pressure with acetylene, bringing it to reaction in a second vessel of which the heated portion contains only liquid to avoid the gas phase with its risk of explosion, then withdrawing it wholly or partly through a suitable valve into a separator or returning it partly through an effective cooler for renewed saturation in the saturator.

The saturation of the solvent with acetylene is preferably effected by the sump process. As solvent for the acetylene there are used substances which exhibit a good solvent power for acetylene, as for example cyclic ethers, such as tetrahydrofurane, or hydrocarbons, especially aromatic hydrocarbons, such as benzene. Mixtures of solvents may however also be used, as for example a mixture of benzene and tetrahydrofurane.

The catalysts are those commonly used in the cyclo-octatetraene synthesis, i.e. nickel compounds, especially intra-complex compounds of nickel with acetyl acetone and acetic acid ester or nickel cyanide and nickel thiocyanide. The catalysts are added to the saturator or elsewhere dissolved or suspended in the particular solvent used. The usual quantity of catalysts per liter of solvent is 0.5 to 30 g., preferably 1.0 to 10.0 grams.

The acetylene pressure in the saturator must be selected so that the acetylene concentration in the solution does not exceed an amount of 200 ml. (milliliters N.T.P.) of gaseous acetylene per milliliter of liquid, because such solutions cannot be caused to explode by ignition. In general there should be set up by the saturation an acetylene concentration of 20 to 170 normal ml. of acetylene per ml. of liquid, advantageously 70 to 150 normal ml. of acetylene per ml. of liquid. If the acetylene concentration is increased up to 200 normal ml. of acetylene per ml. of liquid, special safety precautions are necessary. If the concentration of acetylene is less than 20 ml. to 1 milliliter of the reaction solution the conversion rate is too low.

If the saturation were to be carried out with pure acetylene, the saturation limits would correspond to a pressure of about 3 to 28 excess atmospheres. For saturation by means of a mixture of acetylene and inert gas, for example a mixture of acetylene and nitrogen, there must therefore be produced higher pressures in order to achieve the said partial pressure of acetylene. It should be noted that with increasing total pressure, the acetylene content of the mixture of inert gas and acetylene used must fall. The advantages which the present process offers are exploited above all when saturating at low pressures but by means of gases with the highest possible acetylene partial pressure, for example a gas having an acetylene content of about 99%.

In order to exclude the risk of an explosion in the gas phase of the saturator, this should contain at least 80% of inert gas, for example nitrogen. This desirable stationary state of the gas phase of the saturator is achieved for example by placing the saturator, when it is set in operation, under a nitrogen pressure which amounts to 80% of the saturation pressure concerned. Then undiluted acetylene is forced in up to the saturation pressure. The stationary state is then maintained in a continuous method of operation by so adjusting the amount of waste gas that this corresponds exactly with the amount of inert gas, for example nitrogen, supplied with the saturating gas, so that the level of inert gas in the saturator cannot fall below the above-mentioned condition.

For example at a saturation pressure of 12 excess atmospheres, about 9.5 excess atmospheres of nitrogen are forced in and then the total pressure is brought to 12 excess atmospheres by subsequently forcing in acetylene. If the acetylene used contains about 1% of inert gas, for example nitrogen, 1% of the total amount of acetylene gas subsequently forced in are discharged as waste gas.

The saturation is carried out at low to moderately elevated temperature, in general at from $-10°$ to $+40°$ C., preferably at $+5°$ to $+30°$ C.

The saturated solution is conveyed by means of a pump, the housing of which is preferably cooled to avoid degasification, through a pipe, which is preferably heated to 60° to 80° C., into the reaction vessel which consists essentially of a steel tube. The temperature in the reaction vessel is maintained, e.g. by additional heating at 80° to 140° C., preferably at 100° to 120° C. If larger amounts are reacted the liberated heat developing in the exothermic reaction is sufficient to maintain the desired temperature. If the temperature exceeds 140° C. additional cooling is required.

In order to prevent the acetylene from gassing out from the hot reaction solution, the liquid is kept under a pressure which is greater than the dissolution pressure which corresponds to the acetylene concentration in question at the selected temperature. Pressures of from 10 to 200 atmospheres are commonly applied. This pressure is produced by forcing the solution by means of the above mentioned pump through the reaction vessel and an effective cooler arranged at its highest point into a storage vessel in which a certain amount of inert gas, for example nitrogen, is confined. At a concentration of, for example, 170 normal ml. of acetylene per ml. of solvent consisting of about 80% of tetrahydrofurane and about 20% of benzene and at a temperature of 110° C., a nitrogen pressure of about 120 excess atmospheres is necessary in order to prevent any gassing out of the acetylene. The level of the liquid in the storage vessel, and consequently the volume of the inert gas sealed off or the pressure bearing on the liquid, is kept constant in continuous operation by withdrawing exactly as much liquid as is conveyed into the reaction chamber by the pump, and either decompressing it through a suitable valve into a discharge vessel or also in part returning it cold into the saturator after flowing through the cooler and through another valve. At the same time an amount of fresh catalyst solution corresponding to the amount discharged is pumped into the saturator. The return of part of the reaction solution to the saturator has proved preferable because in this way too marked a fall of the acetylene level in the solution and a consequent diminution in the speed of the reaction are avoided.

The process herein described may be modified by omitting the storage vessel and regulating the pressure necessary in the reaction vessel, instead of by a gas cushion, by means of valves which are inserted in the pipes between the reaction vessel and discharge separator and between the reaction vessel and the saturator, and which open automatically when a predetermined excess pressure has been reached and close again when it has fallen.

The main advantage of the process according to this invention consists in the fact that cyclo-octatetraene can be produced safely in apparatus such as is otherwise usual for working with non-explosive gases without it being necessary to use high inert gas partial pressures.

A further advantage consists in the fact that the whole of the acetylene necessary for the reaction is forced into the saturator in pure form without the addition of inert gases and then supplied to the reaction in dissolved form whereby the process, as already mentioned, is greatly simplified.

The term "excess atmospheres" is employed herein to designate that quantity of pressure above one atmosphere, i.e. normal pressure. Excess atmospheres therefore correspond to a gauge pressure which will indicate one atmosphere less than the absolute pressure; for example, 10 excess atmospheres are equal to 11 absolute atmospheres.

The following examples will further illustrate this invention. The examples are given with reference to the accompanying drawing which shows diagrammatically an apparatus suitable for carrying out the process of this invention. The invention is not limited to the examples or to the apparatus shown in the drawing.

Example 1

8 liters of the mixture consisting of 80% by weight of dry tetrahydrofurane and 20% by weight of benzene to which 4 grams per liter of nickel acetyl acetonate have been added are pumped per hour into the saturation vessel $a$. 8 excess atmospheres of nitrogen are forced in at a temperature of 25° C. and then an acetylene gas which contains about 1% of inert gases, mainly nitrogen, is subsequently forced in up to a total pressure of 10 excess atmospheres. In order to obtain a stationary inert gas level of 80% of the total gas volume in the gas phase of the saturator, 13 to 17 liters of waste gas per hour are discharged through pipe $i$ and the valve $j$.

The saturated solution is continuously conveyed by means of a pump $b$ cooled by brine by way of a preheated pipe at a constant speed of about 24 liters per hour through the reaction vessel $c$ of 4 liters content which is completely filled with liquid. Within this reaction vessel, the temperature is kept constant at 105° to 110° C. The reaction solution then passes into a water-cooled spiral pipe $d$ which is directly attached to the conical head of the reaction vessel and is cooled therein to about 20° to 30° C. Above this spiral pipe there is situated a storage vessel $e$ in which a certain amount of nitrogen is sealed off by the reaction solution and acts as a gas cushion.

About 15 to 16 liters of reaction solution per hour are returned through the pressure release valve $f$ into the saturation vessel for fresh saturation with acetylene. The remainder of the reaction solution pumped through the system per hour, which corresponds to the amount of the feed, is branched off as a discharge and decompressed through the valve $g$ into the separator $h$. This discharge contains, besides small amounts of a black precipitate, from 5 to 6% of cyclo-octatetraene which is recovered in the usual way by filtration and fractional distillation.

Example 2

2 liters per hour of anhydrous benzene containing 8 grams of nickel acetyl acetonate per liter are pumped into the saturation vessel which is kept at a temperature of 30° C. 11.5 excess atmospheres of nitrogen are then forced in and acetylene which contains about 2% by volume of inert gases, mainly nitrogen and hydrogen, is continuously forced in up to a total pressure of 14.5 excess atmospheres. In order to obtain a stationary inert gas level of 80% of the gas volume in the gas phase of the saturator, 4 to 6 liters of waste gas per hour are discharged through valve $j$. At a rate of 15 liters per hour the saturated solution is continuously conveyed by means of a cooled pump $b$ into the reaction vessel $c$ of 4 liters capacity which was preheated at 110° to 115° C.

The pressure in the reaction vessel is 90 excess atmospheres. It is maintained by means of the nitrogen cushion in the storage vessel $e$.

Of the solution leaving the reaction vessel 13 liters per hour are returned through valve $f$ to the saturation vessel after passing through cooling pipe $d$. The remainder of the reaction solution of just over 2 liters which corresponds to the amount of the feed stock is decompressed into the separator $h$. The discharge contains 7 to 8% by weight of cyclo-octatetraene.

Example 3

4 liters per hour of a solution of nickel acetoacetate in anhydrous tetrahydrofurane containing 2 grams of nickel acetoacetate per liter are pumped into the saturation vessel $a$ which is kept at 20° C. Nitrogen is then forced in at a pressure of 7.2 excess atmospheres and acetylene of a degree of purity of 98% is continuously forced in up to a total pressure of 9.3 excess atmospheres. In order to obtain a stationary inert gas level of 80% of the gas volume in the gas phase of the saturator 14 to 16 liters of waste gas per hour are discharged through pipe $i$. At a rate of 30 liters per hour the saturated solution is continuously conveyed by means of a cooled pump $b$ into the reaction vessel $c$ of 4 liters capacity which was preheated to 105° to 110° C. The pressure in the reaction vessel is 100 excess atmospheres.

Of the solution leaving the reaction vessel over-head 26 liters per hour are returned through valve $f$ to the saturation vessel $a$ after passing through cooling pipe $d$. The remainder of about 4.5 liters is decompressed into the separator $h$. The discharge contains 7 to 8% by weight of cyclo-octatetraene.

We claim:

1. In a method of producing cyclo-octatetraene by cyclizing polymerization of acetylene in a reaction solution of a solvent for acetylene, in the presence of a nickel compound as a catalyst for said polymerization and at elevated temperatures and pressures, the improvement which comprises a two-stage continuous process in which the reaction solution is saturated in a first stage at a temperature between minus 10° C. to plus 40° C. with between 20 to 200 normal milliliters of acetylene to one milliliter of reaction solution, passing the saturated reaction solution through a second stage reaction zone, which zone is filled completely by the liquid reaction mixture so that no space is left for a gas phase, the reaction zone being heated to a temperature of between 80° C. and 140° C. and maintained under a pressure of between 10 and 200 excess atmospheres, and decompressing the solution after leaving said second stage reaction zone.

2. In a method of producing cyclo-octatetraene by cyclizing polymerization of acetylene in a reaction solution of a solvent for acetylene, in the present of a nickel compound as a catalyst for said polymerization and at elevated temperatures and pressures, the improvement which comprises a two-stage continuous process in which said solvent for acetylene is introduced into a first stage saturation zone having a liquid phase and a gas phase, saturating said solvent in said first stage with between 70 to 170 normal milliliters of acetylene to one milliliter of solvent, the gas phase in said first stage saturation zone containing at least 80% of an inert gas, passing the saturated solvent from said first stage through a second stage reaction zone from which a gas phase is excluded, the reaction zone being heated to a temperature of between 80° C. to 140° C. and maintained under a pressure of between 10 to 200 excess atmospheres, and withdrawing and decompressing the solvent reaction mixture withdrawn from said second stage reaction zone.

3. The process as claimed in claim 1 wherein part of the reaction mixture after leaving the reaction zone is returned to the acetylene saturating zone.

4. In a method as claimed in claim 1 the improvement which comprises using a solution of a nickel compound in a mixture of benzene and tetrahydrofurane as the reaction solution.

5. A continuous two-stage process for the production of cyclo-octatetraene by cyclizing polymerization of acetylene which comprises saturating a mixture of 80% by weight of tetrahydrofurane and 20% by weight of benzene in which 6 grams per liter of nickel acetyl acetonate have been dissolved with acetylene in a first stage at a pressure of 10 excess atmospheres and a temperature of 25° C., passing the saturated solution through a second stage reaction zone, which zone is filled completely by the reaction mixture so that no space is left for gas phase, the reaction zone being heated to a temperature of between 105° and 110° C. and decompressing the solution after leaving the reaction zone.

6. A continuous two-stage process for the production of cyclo-octatetraene by cyclizing polymerization of acetylene which comprises saturating benzene containing 8 grams of nickel acetyl acetonate per liter with acetylene in a first stage at a pressure of 14.5 excess atmospheres and a temperature of 30° C., passing the saturated solution through a second stage reaction zone, which zone is filled completely by the reaction mixture so that no space is left for a gas phase, the reaction zone being heated to a temperature of between 105° and 115° C. and decompressing the solution after leaving the reaction zone.

7. A continuous two-stage process for the production of cyclo-octatetraene by cyclizing polymerization of acetylene which comprises saturating tetrahydrofurane containing 2 grams of nickel acetic acid ethyl ester per liter with acetylene in a first stage at a pressure of 9.3 excess atmospheres and a temperature of 20° C., passing the saturated solution through a second stage reaction zone, which zone is filled completely by the reaction mixture so that no space is left for a gas phase, the reaction zone being heated to a temperature of between 105° and 115° C. and decompressing the solution after leaving the reaction zone.

References Cited in the file of this patent

UNITED STATES PATENTS

| 2,579,106 | Barnes | Dec. 18, 1951 |
| 2,715,100 | Christian | Aug. 7, 1955 |

FOREIGN PATENTS

| 522,447 | Canada | Mar. 6, 1956 |

OTHER REFERENCES

Fiat Final Report 967, February 28, 1947, pages 2–6 relied on.